United States Patent
Hou et al.

(10) Patent No.: US 9,811,627 B2
(45) Date of Patent: Nov. 7, 2017

(54) METHOD OF COMPONENT PARTITIONS ON SYSTEM ON CHIP AND DEVICE THEREOF

(71) Applicant: TAIWAN SEMICONDUCTOR MANUFACTURING CO., LTD., Hsinchu (TW)

(72) Inventors: Yung-Chin Hou, Taipei (TW); Sandeep Kumar Goel, Dublin, CA (US); Yun-Han Lee, Hsinchu (TW)

(73) Assignee: TAIWAN SEMICONDUCTOR MANUFACTURING CO., LTD., Hsinchu (TW)

( * ) Notice: Subject to any disclaimer, the term of this patent is extended or adjusted under 35 U.S.C. 154(b) by 0 days.

(21) Appl. No.: 14/963,151

(22) Filed: Dec. 8, 2015

(65) Prior Publication Data

US 2017/0161420 A1    Jun. 8, 2017

(51) Int. Cl.

| | |
|---|---|
| *H01L 23/48* | (2006.01) |
| *H01L 23/52* | (2006.01) |
| *H01L 29/40* | (2006.01) |
| *G06F 17/50* | (2006.01) |
| *H01L 21/48* | (2006.01) |
| *H01L 21/768* | (2006.01) |
| *H01L 23/498* | (2006.01) |
| *H01L 23/522* | (2006.01) |
| *H01L 23/528* | (2006.01) |
| *H01L 25/065* | (2006.01) |
| *H01L 25/00* | (2006.01) |

(52) U.S. Cl.
CPC ...... *G06F 17/5072* (2013.01); *G06F 17/5077* (2013.01); *H01L 21/486* (2013.01); *H01L 21/76883* (2013.01); *H01L 21/76898* (2013.01); *H01L 23/49827* (2013.01); *H01L 23/49838* (2013.01); *H01L 23/528* (2013.01); *H01L 23/5226* (2013.01); *H01L 25/0657* (2013.01); *H01L 25/50* (2013.01); *H01L 2225/06541* (2013.01); *H01L 2225/06548* (2013.01)

(58) Field of Classification Search
None
See application file for complete search history.

(56) References Cited

U.S. PATENT DOCUMENTS

| | | | | |
|---|---|---|---|---|
| 2009/0201038 A1* | 8/2009 | Knickerbocker | .. | G01R 1/07314 324/762.05 |
| 2011/0300668 A1* | 12/2011 | Parvarandeh | ......... | H01L 24/95 438/107 |
| 2012/0074581 A1* | 3/2012 | Guzek | ................. | H01L 23/481 257/774 |

* cited by examiner

*Primary Examiner* — Calvin Choi
(74) *Attorney, Agent, or Firm* — Maschoff Brennan (57) ABSTRACT

A partition method includes sorting the plurality of components into a plurality of partitions according to a set of partition criteria and sorting the plurality of components of each partition into a first stack and a second stack according to a set of stack criteria, and the first stack includes a plurality of higher pitch metal layers and the second stack includes a plurality of lower pitch metal layers. The partition criteria include size, power and speed of the component, and the stack criteria include a pitch of a metal layer.

20 Claims, 7 Drawing Sheets

METHOD OF COMPONENT PARTITIONS ON SYSTEM ON CHIP AND DEVICE THEREOF

BACKGROUND

Improvement in integration density has come from repeated reductions in minimum feature size, which allows more components to be integrated into a given area. In an attempt to increase circuit density, three-dimensional (3D) integrated circuits (ICs) have been investigated. In a typical formation process of a 3D IC, two dies are bonded together and electrical connections are formed between each die and contact pads on a substrate. Interposer stacking is part of 3D IC technology where a through-silicon via (TSV) embedded interposer is connected to a device silicon with a micro bump. 3D IC manufacturing process flows can be separated into two types. In a chip-on-chip-on-substrate (CoCoS) process flow, a silicon interposer chip is first attached onto a packaging substrate, and then a different device silicon chip is attached onto the interposer. In a chip-on-wafer-on-substrate (CoWoS) process flow, a device silicon chip is first attached onto a silicon interposer wafer, which is then diced. The resulting stacked silicon is then attached onto a substrate.

However, when more devices are put into one chip, more complex designs are required. A system on chip (SOC) has multiple metal layers, not all components on the SOC require advanced process. The processing to all the metal layers vary depending on many factors, for example, pitch. A processing without discrimination to different metal layers is likely to result in high production cost.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

A chip package structure can be used as a component in 3D integrated circuit (IC) manufacturing and may be overlaid on a substrate, a board, a wafer, or other chips or chip packages. For example, the chip package may have a memory device or related components, a processor, other chip logic, or a combination thereof. The chip package may have a second chip or die positioned on a first chip or die using a CoWoS like process flow. The process flow provides wafer level packaging with specialized component partition.

As 3D ICs integration technology continues to evolve, multiple layer of metals are stacked on a single chip. This multi-layered architecture includes metal layers coming with all different dimensions. It is not uncommon to find higher level metal layers having larger width and pitch, compared with the lower level metal layers. The higher level metal layers occupy larger area on the chip, and the higher and lower level metal layers do not scale down at the same rate because of their diverse dimensions in the first place. A SOC may include one or more stacked chips or chip logic, which may further include one or more stacked dielectric, conductive and/or semiconductor layers. For example, the stacked chips or chip logic may correspond to one or more overlaid memory devices (e.g., flash memory and DRAM memory), one or more processors or processor cores (e.g., CPU cores), other digital logic, or a combination thereof. However, not all components of SOC require advanced processing. Multiple process nodes have the same definition of back end of line (BEOL). Removing higher metal layers (e.g., metal layer 5-7) from advanced process chips and manufacturing these metal layers by older process node results in considerable production cost.

Embodiments are described herein with respect to a specific context, namely a chip package built using a CoWoS like process flow that involves a system-on-chip (SoC) component partition and electrical connection establishment of the higher level metal layers. This disclosure may also be applied, however, to other integrated circuits, electronic structures, and the like.

Figure 1:
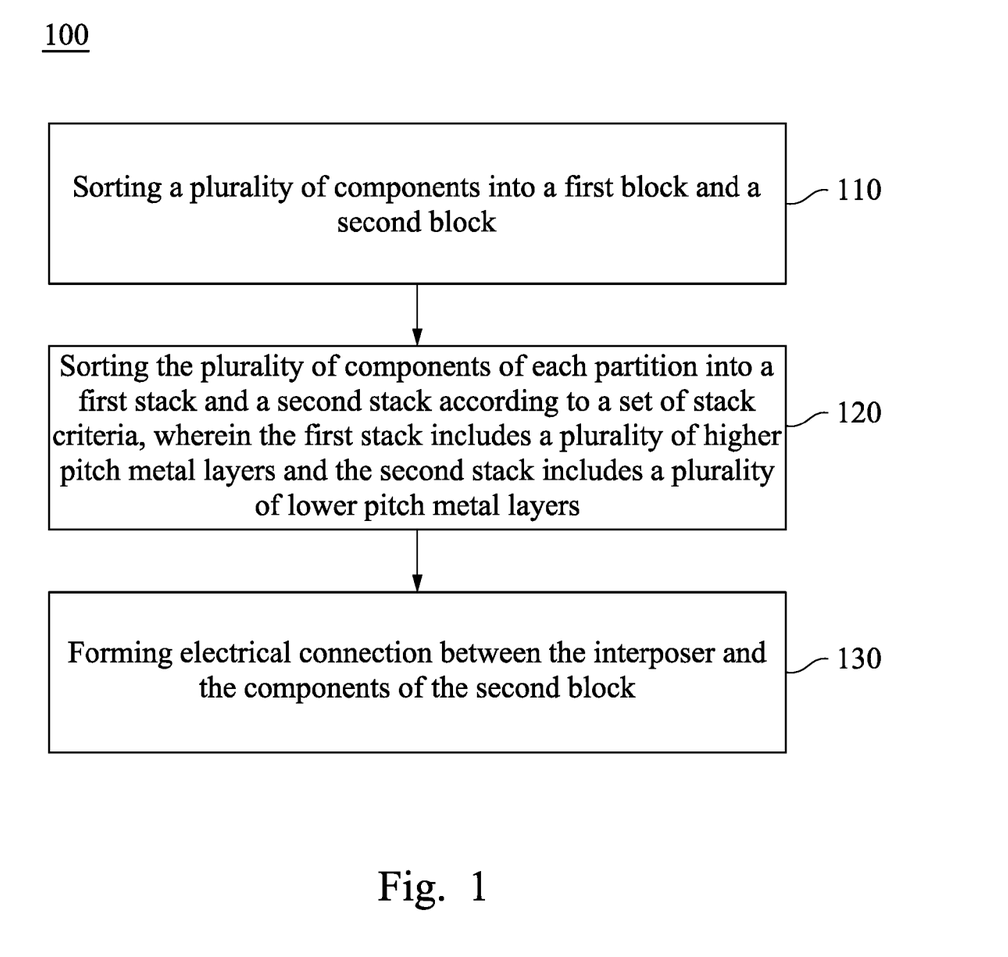
FIG. 1 is a block diagram illustrating a method of component partition on system on chip in accordance with some embodiments of the instant disclosure.

Turning now to FIG. 1, illustrated is an embodiment of a method 100 of partitioning a plurality of components of a SOC. Embodiments of the method 100 shown in FIG. 1 are further illustrated in the schematic diagram of FIG. 2, and reference should be made to the figure as called out in the text below.

Figure 2:
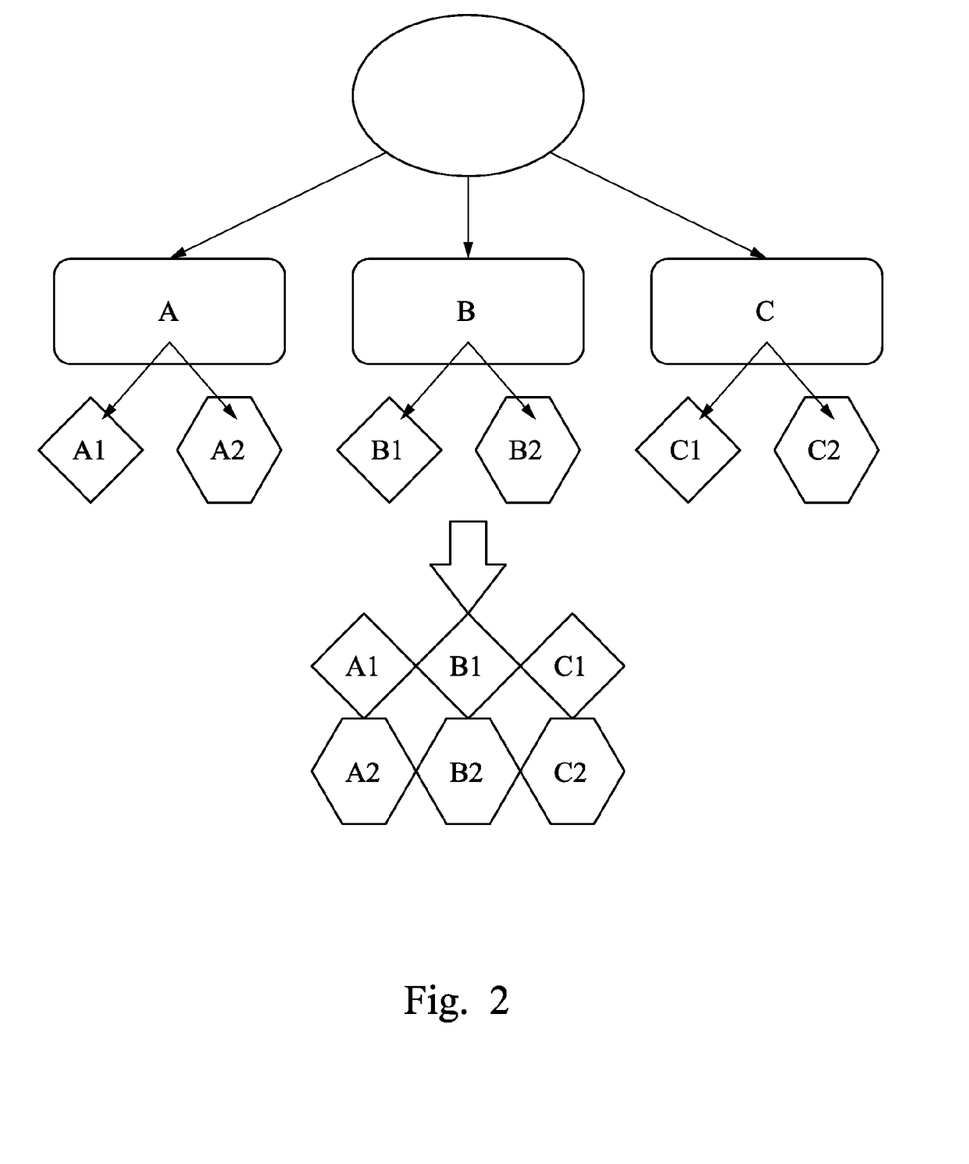
FIG. 2 is a flow chart illustrating a method of component partition on system on chip in accordance with some embodiments of the instant disclosure.

As set forth in operation 110 of FIG. 1, a plurality of components of a SOC is sorted into a plurality of partitions according to a set of partition criteria. This is illustrated in FIG. 2, which shows a schematic flow chart of the partition process. The SOC includes many components in different blocks, for example, CPU, GPU, memory devices or the like. These components are firstly divided into different partitions A, B and C shown in FIG. 2. These components are sorted according to a set of partition criteria. The partition criteria include but not limited to the process node (size of the block), power consumption, processing speed, the type of block, the cost of the block and the like. More specifically, the feature size determines the area of the partition, and components having similar block dimension can be put together. For example, the partition A may have a feature size of 10 nm, the partition B of 16 nm, and the partition C of 28 nm. However, the instant disclosure is not limited thereto. The power consumption refers to an active power, where leakage current should be taken into account. The processing speed is another factor that contributes to the component partition. For example, higher processing speed components can be sorted under partition A, while lower processing speed components can be sorted under partition B, and components in partition C may have slow processing speed. The type of block is a less dominant partition criterion, which sometimes depends on the material characteristics provided by a third party vendor. Of course, the production cost has to be considered. That is, the components of the SOC are divided according to minimum process required, which ultimately leads to minimum production cost. After first stage sorting according to the partition criteria, the logic of the device can be obtained. It should be understood that partition A, B and C shown in FIG. 2 are embodiments of the method, and the number of partitions may be more or less depending on practical requirement.

As set forth in operation 120 shown in FIG. 1, after the component being divided according to partition criteria, in each of the partition A, B and C, components having similar property are sorted into different stacks according to a set of stack criteria. Take partition A for example. The components are further sorted according to a set of stack criteria. More specifically, higher level metal layers, which have larger width and pitch routing, are sorted into a first stack A1. Lower level metal layers are sorted into a second stack A2. For example, higher level metal layers MY/MZ (BEOL), whose width/pitch is larger than 80 μm are grouped under the first stack A1, while lower level metal layer MX, whose pitch is smaller than 80 and front end (FE) are grouped under the second stack A2. This second stage sorting process determines the layout in the partition A. Similarly, in each of the remaining partition, namely partition B and C, the same process is applied. Higher level metal layers, for example, M5-7, are sorted into first block B1 and C1. Lower level metal layers, for example, M1-4, are sorted into second block B2 and C2.

The first stack includes higher level metal layers which has similar size in width and pitch and can be electrically connected through an interposer by the most cost effective process node. This is schematically illustrated in FIG. 2, where the first stacks A1, B1 and C1 are arranged at the same level for a shared routing. The conductive means between the first stacks, which have the higher level metal layers, and the second stacks can be achieved through various means. The detail device architecture will be elaborated hereinafter.

In operation 130, the electrical connection is established according to the related metal layer of the first and second stacks.

Figure 3:
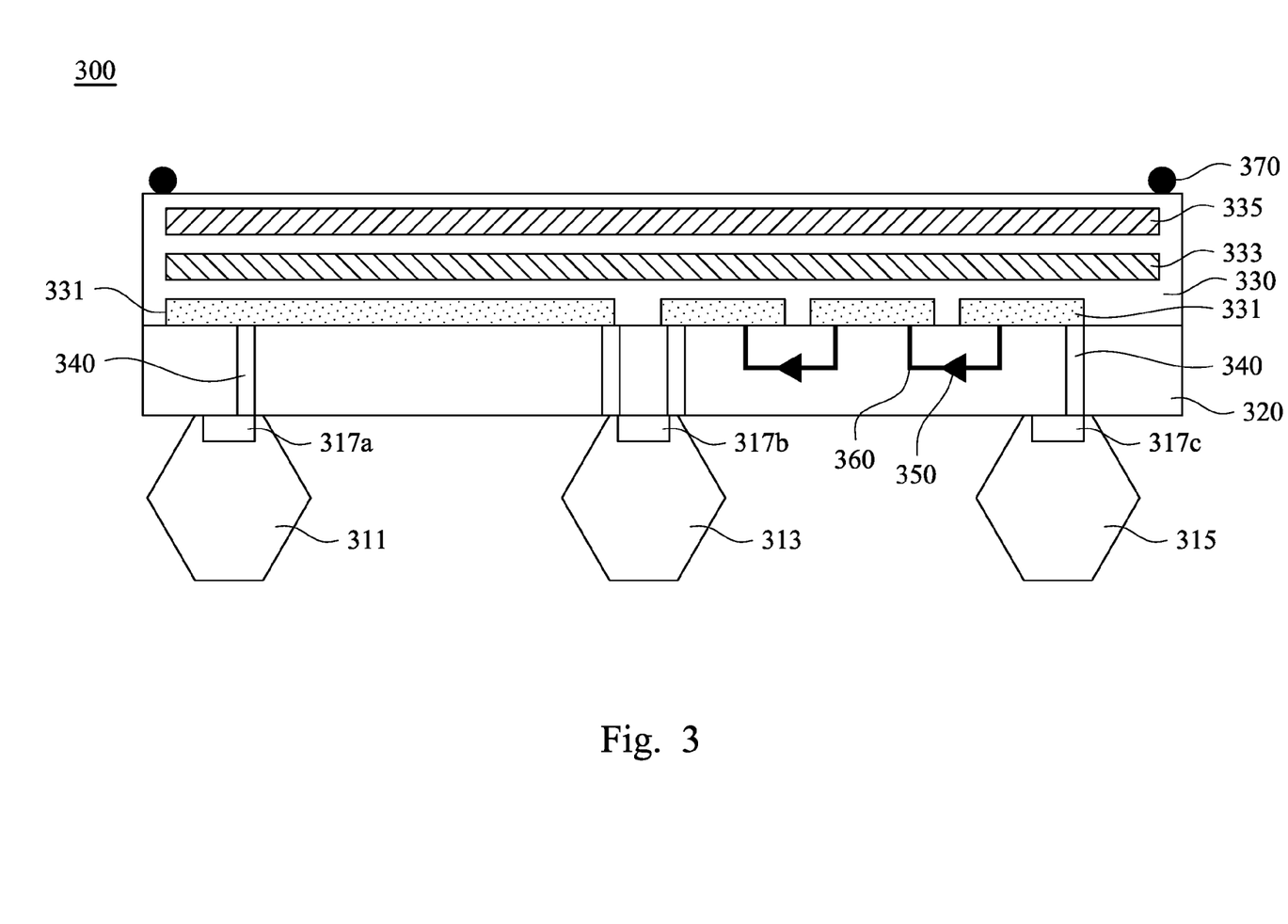
FIG. 3 is a schematic diagram illustrating an architecture of system on chip in accordance with some embodiments of the instant disclosure.

Turning now to FIG. 3, illustrated is an embodiment of a SOC architecture built according to the partition method discussed. The components of SOC 300 are arranged according to the partition criteria and the stack criteria. The components in the first stacks have the higher level metal layers, namely, at least a second metal layer 331 and at least a third metal layer 333. These higher pitch metal layers are electrically connected through an interposer 330. In other words, the higher pitch metal layers of different components in the first stacks share the same routing. The external connectors and vias of the interposer 330 are not shown for the sake of clarity. The interposer 330 provides electrical communication in between the second and third metal layers 331, 333, and to a (front side) redistribution layer (RDL) 335 in this embodiment. The horizontal connection among the first stacks is formed by the interposer 330. A plurality of package pins 370 is disposed on the interposer, where package connection is established through the pins 370, and this side of the interposer is denoted as a back side. The first stacks can be collectively referred to as the interposer 330.

A substrate 320 is disposed at the front side of the interposer 330, opposite to the package pins 370 at the front side. The second stacks (or dies) 311, 313 and 315 have the lower level metal layer, namely, at least a first metal layer 317a, 317b and 317c in each of the second stacks respectively. The dies 311, 313 and 315 are disposed on the substrate 320, which is at the front side of the interposer 330. The conductive means between the first stacks/interposer 330 and the second stacks/dies 311, 313 and 315 is achieved by through substrate vias (TSVs) 340. One of the TSVs is disposed and aligned in between the first metal layer 317a and the second metal layers 331. The remaining TSVs connects between the first metal layers 317b and 317c through similar configuration. The TSVs 340 span the length of the substrate 320 and connect the dies 311, 313 and 315 to the second metal layers of interposer 330. Chip-on-wafer technique is employed for establishing electrical path in between the interposer 330 and the dies 311, 313 and 315, and the conductive path is joined by the TSVs 340. The conductive path travels from the first metal layer 317a, 317b and 317c to the redistribution layer 335 through the TSVs, the second metal layer 331 and the third metal layer 333 in succession, and the later two are connected by the interposer 330.

The packaging industry sometimes categorizes an interposer as being "active", "passive" or "active-lite". A passive interposer can refer to an interposer that can make electrical connections predominantly using passive wires, while having a minimum number of, e.g., zero, active device elements (e.g., diodes, transistors or the like). An "active-lite" interposer can refer to something in between a true passive interposer and an active die. It can contain, for example, wires and a limited number of electronic elements. An "active-lite" interposer can have the low-cost benefit of a passive interposer and to invest only little to have some extra benefits without going to the price of a full active die. The interposer 330 is an active-lite interposer, which refers to an active interposer with limited functionality. The interposer 330 includes buffers 350 and wiring 360. The wiring 360 may be system-level electrical static discharge (ESD) protection circuitry.

It should be understood that the number of dies, metal layers and TSVs may be more or less than that shown in FIG. 3 according to practical requirement.

A specific example is provided incorporated with the previously discussed partition method. Components of an SOC is sorted according to partition criteria into three partitions, namely partition A (feature size: 10 nm), partition B (feature size: 16 nm) and partition C (feature size: 28 nm). Components of the partition A are further sorted according to stack criteria, where BEOL metal layer (e.g., first metal layer 317a) having a pitch less than 80 μm and FE are put together as a second stack A2. The remaining BEOL metal layers (e.g., second metal layer 331 and third metal layer 333) of the partition A have a pitch larger than 80 μm and are arranged as a first stack A1. The same sorting process applies to the partitions B and C, and the resulting groups are first stacks A1, B1 and C1 and the second stacks A2, B2 and C2 (e.g., second stacks 311, 313 and 315). Horizontal electrical communication among the first stacks A1, B1 and C1 is achieved by the interposer (e.g., interposer 330) using the most cost effective process node (e.g., feature size: 65 nm). Vertical electrical communication between the interposer and the second stacks (dies) is achieved by conductive means (e.g., TSVs 340), which connects between the metal layers.

Figure 4:
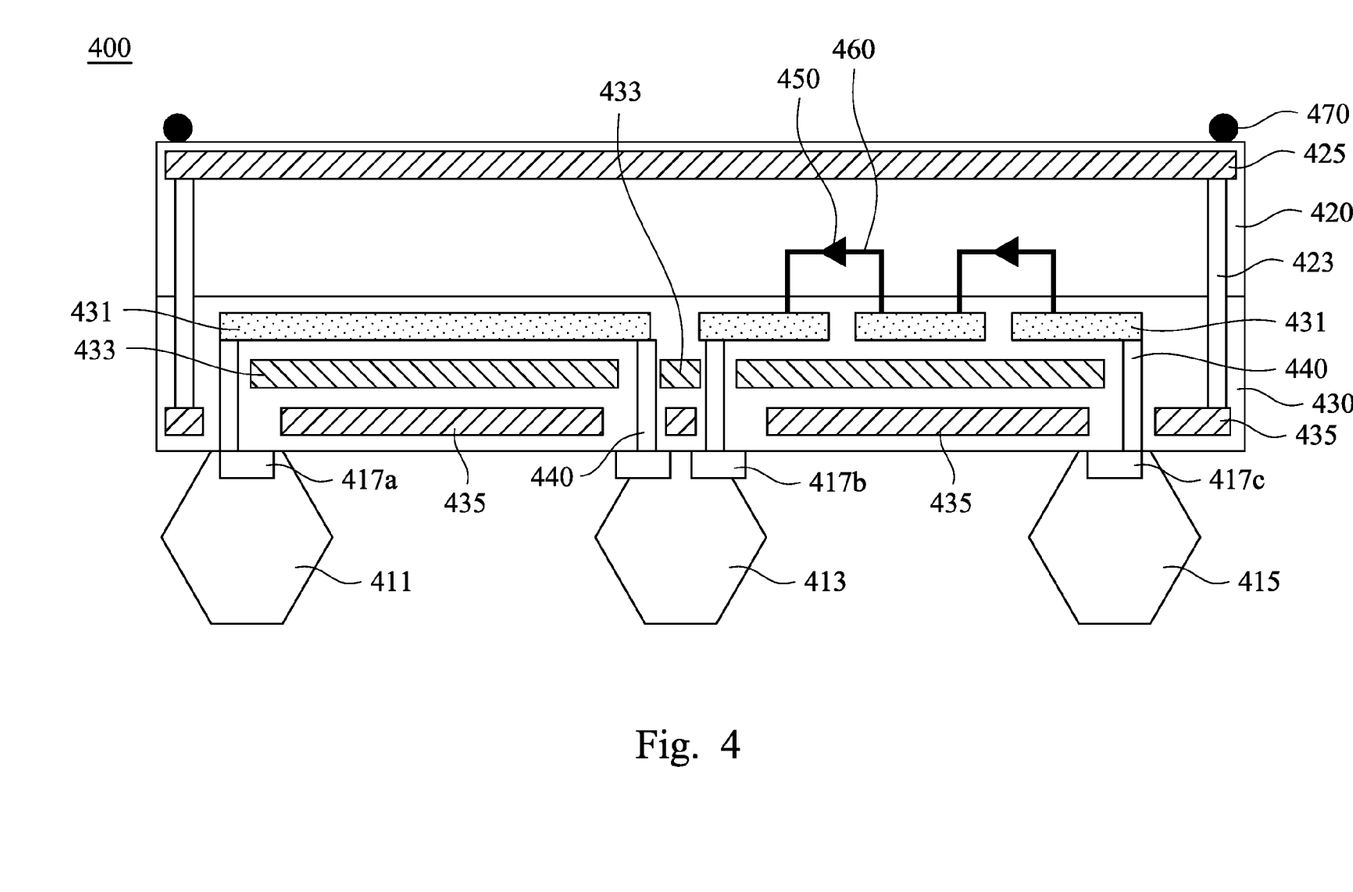
FIG. 4 is a schematic diagram illustrating an architecture of system on chip in accordance with some embodiments of the instant disclosure.

Attention is now invited to FIG. 4. Still another embodiment of a SOC architecture built according to the partition method is discussed. The components of SOC 400 are arranged according to the partition criteria and the stack criteria. The components in each of the first stacks are the higher level metal layers, namely, at least a second metal layer 431 and at least a third metal layer 433. These higher pitch metal layers are electrically connected through an interposer 430. The interposer 430 provides electrical communication in between the second and third metal layers 431, 433, and to a first (front side) redistribution layer (RDL) 435 using the most cost effective process node. In other words, the shared electrical connection among the first stacks is formed by the interposer 430.

A substrate 420 is disposed on the back side of the interposer 430, and a second (back side) redistribution layer 425 is formed in the substrate 420. A plurality of package pins 470 is disposed on the substrate 420. The electrical communication between the first and second redistribution layers 435, 425 is formed by through substrate vias (TSVs) 423. Signal transmission from the front to the back side of the interposer 430 goes through the first redistribution layer 435, the through substrate vias 423, the second redistribution layer 425 and the package pins 470.

The second stacks (or dies) 411, 413 and 415 have the lower level metal layers, namely, at least a first metal layer 417a, 417b and 417c in each of the second stacks respectively. The dies 411, 413 and 415 are disposed opposite to the substrate 420, which is at the back side of the interposer 430. The conductive means between the first stacks/interposer 430 and the second stacks/dies 411, 413 and 415 is achieved by inter-tier vias 440. One of the inter-tier vias 440 is disposed and aligned in between the first metal layer 417a and the second metal layers 431. The remaining inter-tier vias 440 connects between the first metal layers 417b and 417c through similar route. The inter-tier vias 440 are smaller than the through substrate vias because they travel a shorter distance, which is measured approximately by the thickness of the interposer 430 or alternatively between the first metal layer 417a and the second metal layer 431. The inter-tier vias may also refer to as micro bump (μ-bump), which is used between the die and the interposer, transmitting signals between the layers and provides shorter path. Compared with the metal lines within the interposer, the micro bump has lower resistance and reducing wiring density, and therefore the signal integrity is improved because of less interference and crosstalk. The conductive path spans from the first metal layer 417a, 417b and 417c to the second metal layers 431 through inter-tier vias 423. The signal is further carried along the path from the first redistribution layer 435 at the front side to the second redistribution layer 425 through the through substrate vias 423. The interposer 430 is an active-lite interposer, which refers to an active interposer with limited functionality. The interposer 430 includes buffers 450 and wiring 460. The wiring 460 may be system-level electrical static discharge (ESD).

Figure 5:
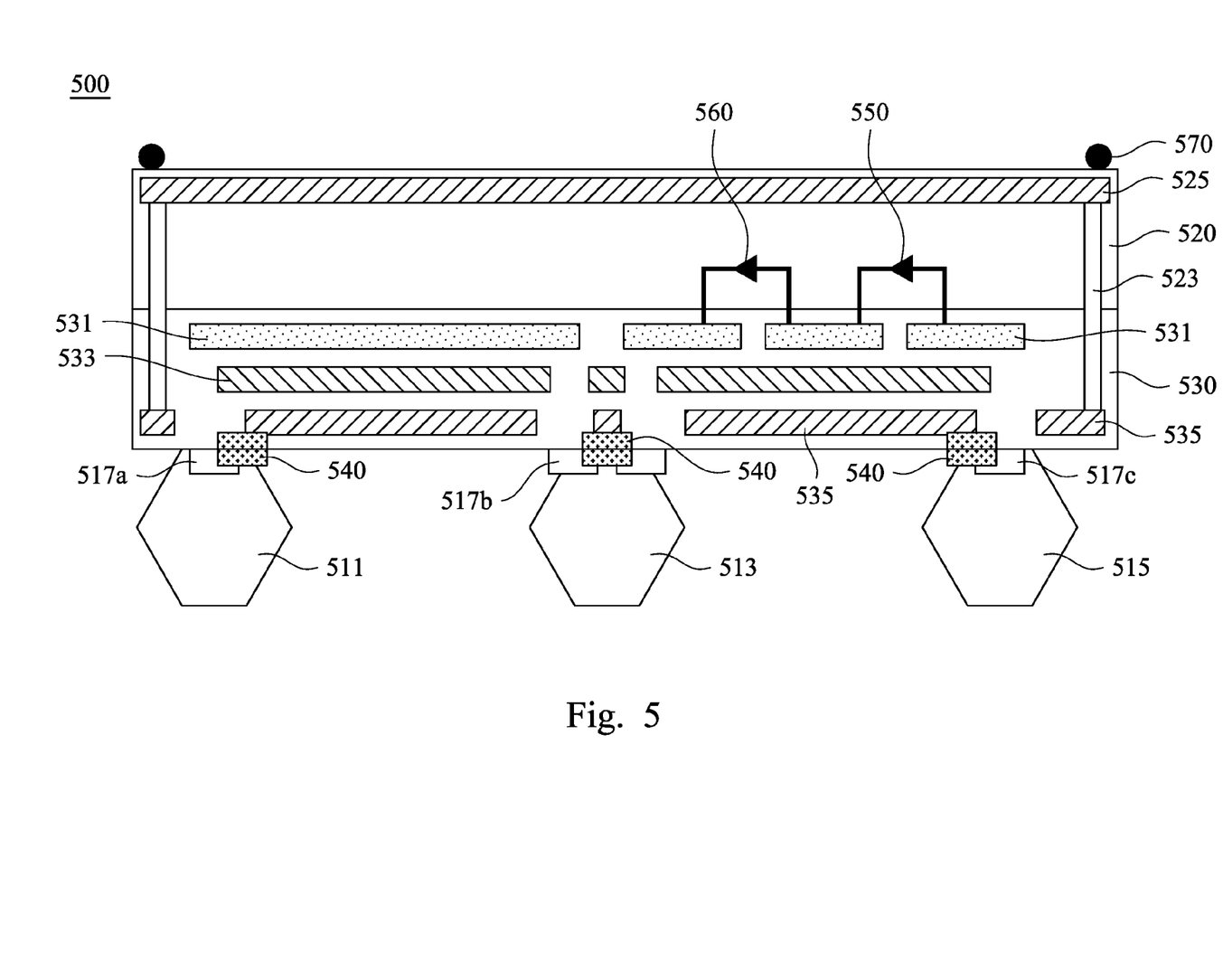
FIG. 5 is a schematic diagram illustrating an architecture of system on chip in accordance with some embodiments of the instant disclosure.

Attention is now invited to FIG. 5. Still another embodiment of a SOC architecture built according to the partition method is discussed. The components of SOC 500 are arranged according to the partition criteria and the stack criteria. The components in each of the first stacks are the higher level metal layers, namely, at least a second metal layer 531 and at least a third metal layer 533. These higher pitch metal layers are electrically connected through an interposer 530. The interposer 530 provides a shared platform between the second and third metal layers 531, 533 from different components, and to a first (front side) redistribution layer (RDL) 535.

A substrate 520 is disposed on the back side of the interposer 530, and a second (back side) redistribution layer 525 is formed in the substrate 520. A plurality of package pins 570 is disposed on the substrate 520. The electrical communication between the first and second redistribution layers 535, 525 is formed by through substrate vias (TSVs) 523. Signal transmission from the front to the back side of the interposer 530 goes through the first redistribution layer 535, the through substrate vias 523, the second redistribution layer 525 and the package pins 570.

The second stacks (or dies) 511, 513 and 515 have the lower level metal layers, namely, at least a first metal layer 517a, 517b and 517c in each of the second stacks 511, 513 and 515 respectively. The dies 511, 513 and 515 are disposed opposite to the substrate 520, which is at the back side of the interposer 530. The conductive means between the first stacks/interposer 530 and the second stacks/dies 511, 513 and 515 is achieved by metal/oxide bonding. More specifically, a wafer-on-wafer technique is used in the SOC 500. As shown in FIG. 5, metal bonding 540 is disposed in between the first redistribution layer 535 and the first metal layer 517a. In other words, the conductive path between the die and the interposer goes from the first metal layer 517a to the first redistribution layer 535 through the metal bonding 540. The bonding may be metal bonding, high temperature oxide bonding or metal oxide hybrid bonding. The first redistribution layer 535 is electrically connected to the second redistribution layer 525 in the substrate 520 through the through substrate vias 523. The interposer 530 is an active-lite interposer and includes buffers 550 and wiring 560. The wiring 560 may be system-level electrical static discharge (ESD) protection circuitry.

Figure 6:
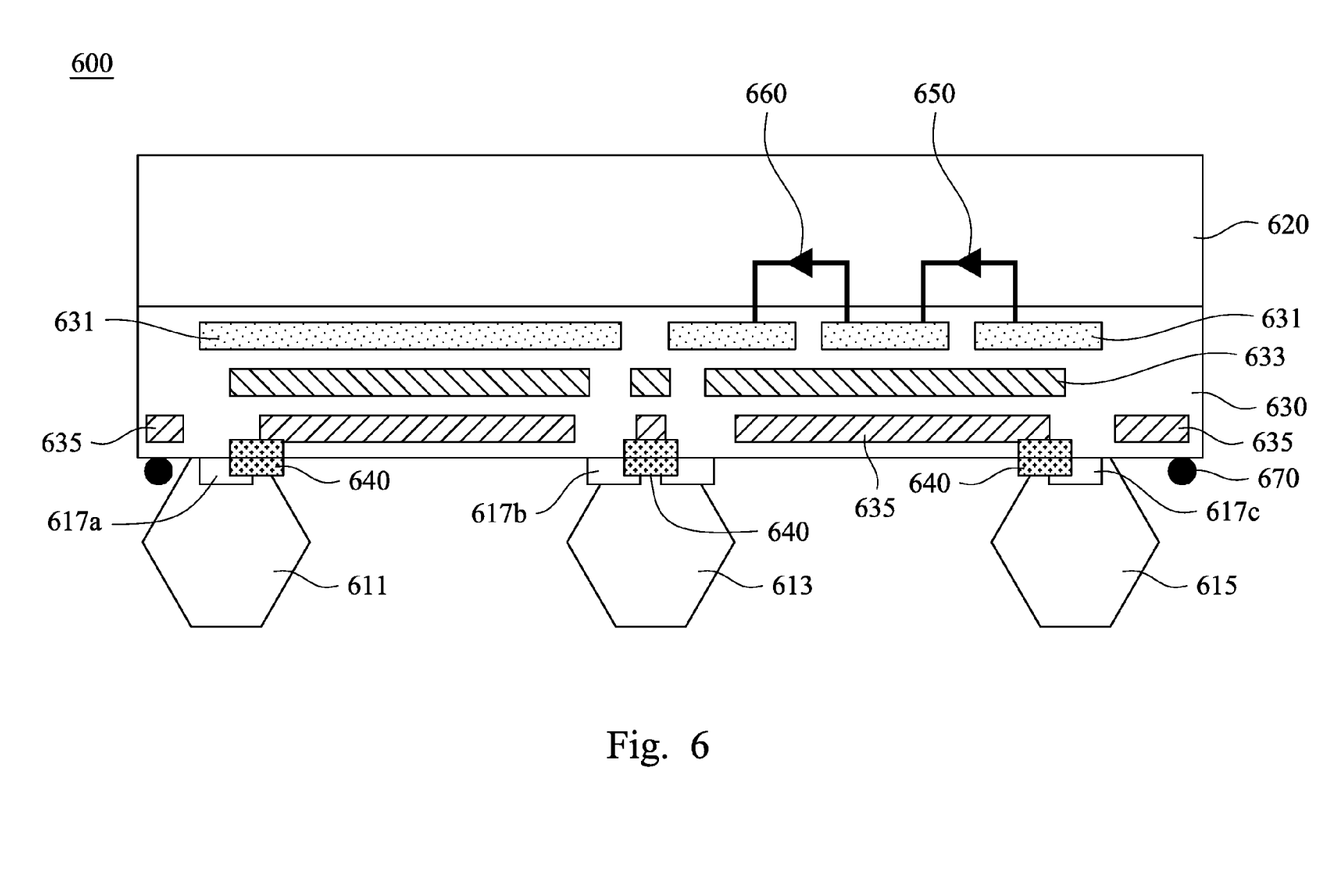
FIG. 6 is a schematic diagram illustrating an architecture of system on chip in accordance with some embodiments of the instant disclosure.

Attention is now invited to FIG. 6. Still another embodiment of a SOC architecture built according to the partition method is discussed. The components of SOC 600 are arranged according to the partition criteria and the stack criteria. The components in each of the first stacks are higher level metal layers, including at least a second metal layer 631 and at least a third metal layer 633. These higher pitch metal layers of different components are electrically connected through an interposer 630. The interposer 630 provides electrical communication between the second and third metal layers 631, 633, and to a first (front side) redistribution layer (RDL) 635.

A substrate 620 is disposed on the back side of the interposer 630, and a plurality of package pins 670 is disposed on the front side of the interposer 630, opposite to the substrate 620. This arrangement is feasible when the second stacks/dies are low pin count device, which occupies less space and therefore more room for the package pins at the front side of the interposer 630.

The second stacks (or dies) 611, 613 and 615 have the lower level metal layers, namely, at least a first metal layer 617a, 617b and 617c respectively. The conductive means between the first stacks/interposer 630 and the second stacks/dies 611, 613 and 615 is achieved by metal/oxide bonding. As shown in FIG. 6, a metal bonding 640 is disposed in between the first redistribution layer 635 and the first metal layer 617*a*. Signals from the dies 611, 613 and 615 go through the first metal layer 617*a* and metal bonding 640 to the first redistribution layer 635 and the second and third metal layers 633, 631 via the shared interposer 630. Package connection has a route from the first redistribution layer 635 to the package pins 670 at the front side. Through substrate vias are absent in this embodiment. The interposer 630 is an active-lite interposer and includes buffers 650 and wiring 660. The wiring 660 may be system-level electrical static discharge (ESD) protection circuitry.

Figure 7:
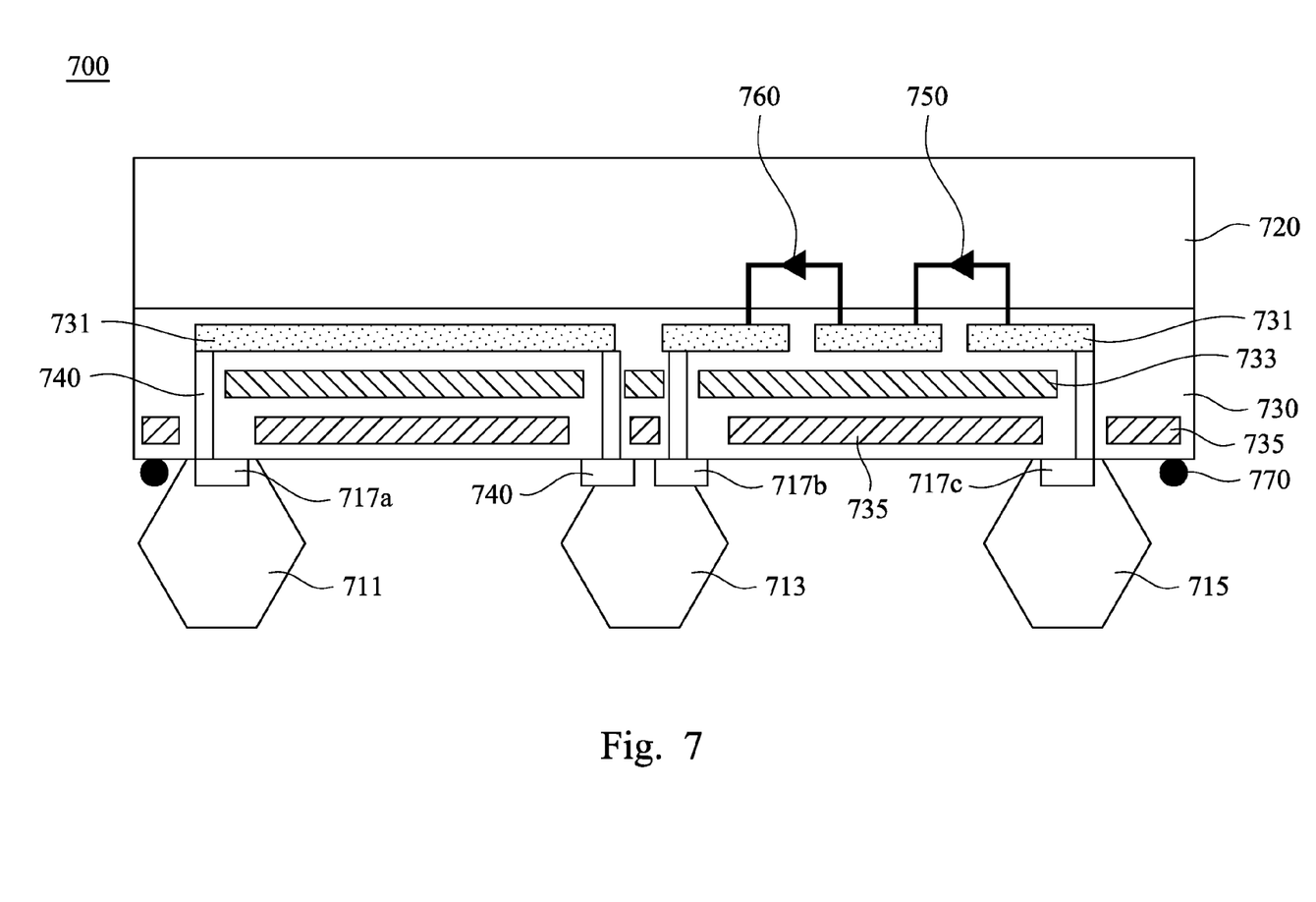
FIG. 7 is a schematic diagram illustrating an architecture of system on chip in accordance with some embodiments of the instant disclosure.

Attention is now invited to FIG. 7. Yet another embodiment of a SOC architecture built according to the partition method is discussed. The components of SOC 700 are arranged according to the partition criteria and the stack criteria. The components in each of the first stacks are higher level metal layers, including at least a second metal layer 731 and at least a third metal layer 733. These higher pitch metal layers of different components are electrically connected through an interposer 730. The interposer 630 provides electrical communication between the second and third metal layers 731, 733, and to a first (front side) redistribution layer (RDL) 735.

A substrate 720 is disposed on the back side of the interposer 730, and a plurality of package pins 770 is disposed on the front side of the interposer 730, opposite to the substrate 720. The second stacks (or dies) 711, 713 and 715 have the lower level metal layers, namely, at least a first metal layer 717*a*, 717*b* and 717*c* respectively. The conductive means between the first metal layers 717*a*, 717*b* and 717*c* and the second metal layers 731 is achieved by micro bump in the form of inter-tier vias 740. The inter-tier vias 740 go through the thickness of the interposer 730 and electric communication can be established. Signals from the 711, 713 and 715 go through the first metal layers 717*a*, 717*b* and 717*c* respectively and the inter-tier vias 740 to the second metal layer 731. The second metal layer 731 and the third metal layer 733 share electrical communication through the interposer 730, and the package connection has a route from the first redistribution layer 735 to the package pins 770 at the front side of the interposer 730. The interposer 730 is an active-lite interposer and includes buffers 750 and wiring 760. The wiring 760 may be system-level electrical static discharge (ESD) protection circuitry.

The partition method provides cost effective alternative to chips in advanced process nodes. The higher level metal layers have larger pitch, do not scale well and occupy larger area are sorted together. They share the interposer under the same process node. The temporary withdrawal of the higher level metal layers from each partition eases the routing congestion. In addition, similar sized metal layers are grouped together such that the area design can fit to the components closely. The yield, performance and utilization of the chip can be improved. Furthermore, since the higher level metal layers from different partitions are grouped and connected through an interposer, the number of required mask is reduced, and hence the overall cost reduces. Diffused intellectual property blocks (also referred to as IP or macron function blocks) certified in dated process generation, including, for example, processor cores, high-speed interfaces and memory, can be configured through the metal layers and reused.

In an aspect of the instant disclosure, a partition method includes sorting the plurality of components into a plurality of partitions according to a set of partition criteria and sorting the plurality of components of each partition into a first stack and a second stack according to a set of stack criteria, and the first stack includes a plurality of higher pitch metal layers.

In another aspect of the instant disclosure, a method of manufacturing system on chip (SOC) having a plurality of components includes sorting the components according to a set of partition criteria and a set of stack criteria to first stacks and second stacks. An interposer is formed for electrically connecting the first stacks. A redistribution layer is formed in the interposer. A conductive means is formed in between the second stacks and the interposer. A substrate is deposited on the interposer.

In still another embodiment of the instant disclosure, a system-on-chip having a plurality of components is provided. The system-on-chip includes a plurality of partitions. Each of the partition includes a plurality of components sorted according to a set of partition criteria, and each of the partition is sorted into a first stack and a second stack according to a set of stack criteria. An interposer is disposed on the second stack and electrically connecting between the components of the first stack. At least a conductive element is disposed in between the interposer and the second stacks.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A method of partitioning a plurality of components of a system-on-chip (SOC), comprising:
   sorting the plurality of components into a plurality of partitions according to a set of partition criteria; and
   sorting the plurality of components of each partition into a first stack and a second stack according to a set of stack criteria, wherein the first stack includes a plurality of higher pitch metal layers and the second stack includes a plurality of lower pitch metal layers.

2. The method according to claim 1, wherein the partition criteria include size, power and speed of the component, and the stack criteria include a pitch between the metal layers.

3. The method according to claim 1, further comprising:
   piling the first stack on the second stack.

4. A method of manufacturing system on chip (SOC) having a plurality of components, comprising:
   sorting the components according to a set of partition criteria and a set of stack criteria to a plurality of first stacks and a plurality of second stacks, the first stack having a plurality of first metal layers, the second stack having a plurality of second metal layers, wherein a first pitch between the first metal layers is different form a second pitch between the second metal layers;
   piling the first stacks on the second stacks;
   forming an interposer for electrically connecting between the first metal layers of the first stacks; and
   forming conductive means in between the second stacks and the interposer.

5. The method according to claim 4, wherein the partition criteria includes size, power, and speed of the component.

6. A system on chip comprising:
a plurality of first metal layers having a first pitch;
a plurality of second metal layers having a second pitch smaller than the first pitch, the first metal layers being disposed on the second metal layers;
an interposer disposed over the second metal layers and electrically connecting between the first metal layers; and
at least a conductive element disposed in between the interposer and the second metal layers.

7. The system on chip according to claim 6, further comprising a substrate disposed in between the interposer and the second metal layers, and the conductive elements are through substrate vias going through the substrate.

8. The system on chip according to claim 6, further comprising:
a substrate disposed on the interposer;
a first redistribution layer disposed in the interposer; and
a second redistribution layer disposed in the substrate, the first redistribution layer and the second redistribution layer being connected by a through substrate via.

9. The system on chip according to claim 8, wherein the conductive elements between the first redistribution layer and the second metal layers are inter-tier vias or metal or oxide bonding.

10. The system on chip according to claim 6, further comprising:
a substrate disposed on the interposer; and
at least a package pin disposed on the interposer opposite to the substrate.

11. The method according to claim 4, further comprising:
forming a substrate on the second stacks before the forming the interposer.

12. The method according to claim 11, further comprising:
forming a through substrate via in the substrate between the interposer and the second stacks.

13. The method according to claim 11, further comprising:
forming a redistribution layer in the interposer over the first stacks.

14. The method according to claim 4, further comprising:
forming a substrate on the interposer over the first stacks.

15. The method according to claim 14, further comprising:
forming a first redistribution layer in the interposer, the first redistribution layer arranged over the second metal layers of the second stacks;
forming a second redistribution layer in the substrate; and
forming conductive means in between the first redistribution layer and the second redistribution layer.

16. The method according to claim 15, further comprising:
forming an inter-tier via in the interposer between the first metal layers of the first stacks and the second metal layers of the second stacks.

17. The method according to claim 15, further comprising:
forming a bump in between the first redistribution layer and the second stacks.

18. The method according to claim 14, further comprising:
forming a first redistribution layer in the interposer over the second metal layers of the second stacks; and
forming a bump in between the first redistribution layer and the second metal layers.

19. The method according to claim 14, further comprising:
forming a first redistribution layer in the interposer over the second metal layers of the second stacks; and
forming an inter-tier via in between the first metal layers of the first stacks and the second metal layers of the second stacks.

20. The system according to claim 8, wherein the conductive elements between the first metal layers and the second metal layers are inter-tier vias.

* * * * *